Aug. 17, 1965

N. E. GADDINI 3,200,968

FRUIT ORIENTING JET UNIT

Filed Dec. 23, 1963

INVENTOR.
Norman E. Gaddini
BY
Webster & Webster
ATTYS.

United States Patent Office 3,200,968
Patented Aug. 17, 1965

3,200,968
FRUIT ORIENTING JET UNIT
Norman E. Gaddini, Rte. 1, Box 86, Winters, Calif.
Filed Dec. 23, 1963, Ser. No. 332,717
10 Claims. (Cl. 214—1)

This invention relates to fruit halving and pitting machines, and particularly represents an improvement in the fruit orienting means as shown in my co-pending application Serial No. 216,529, filed Aug. 13, 1962, now Patent No. 3,138,184.

In the machine of the above identified application, the fruit (as deposited in the cup which delivers the fruit to the halving knives) was oriented by a relatively forceful flow of water into the cup from below; such flow having impinged against the entire underside of the fruit including the central lower area thereof. This was found to provide an action which did not always orient the fruit to the desired horizontal suture position in the cup; the reason being that the water flow against the central lower area of the fruit sometimes entered and then tended to hold the stem cavity of the fruit in a downward position. Also, the water flow had to have sufficient force or pressure to lift the entire weight of the fruit in the cup.

The major object of the present invention is to provide a water actuated fruit orienting unit which is operative to quickly and properly orient the fruit in the cup, yet without a forceful flow of water against the central lower area of the fruit. Hence there is no tendency for the fruit to remain with the stem cavity in an undesirable downward position.

Another important object of the invention is to provide a fruit orienting unit, as above, in which the effective orienting action is produced by water jets which impinge against the underside of the cup supported fruit at other than the central lower area thereof.

An additional object of the invention is to provide a fruit orienting unit, as in the preceding paragraph, wherein the fruit (while remaining in the cup) semi-floats in a quantity of water other than the immediate water jets. Such semi-floating of the fruit facilitates the orienting action and permits the use of water jets having less pressure than otherwise necessary. Furthur, as the water jets work below the surface of such quantity of water, the jets are damped and spray is not thrown onto the remainder of the machine or the floor when the cup is empty.

A further object of the invention is to provide a fruit orienting jet unit which is designed for ease and economy of manufacture.

A still further object of the invention is to provide a practical, reliable, and durable fruit orienting jet unit and one which is exceedingly effective for the purpose for which it is designed.

These objects are accomplished by means of such structure and relative arrangement of parts as will fully appear by a perusal of the following specification and claims.

Figure 1:
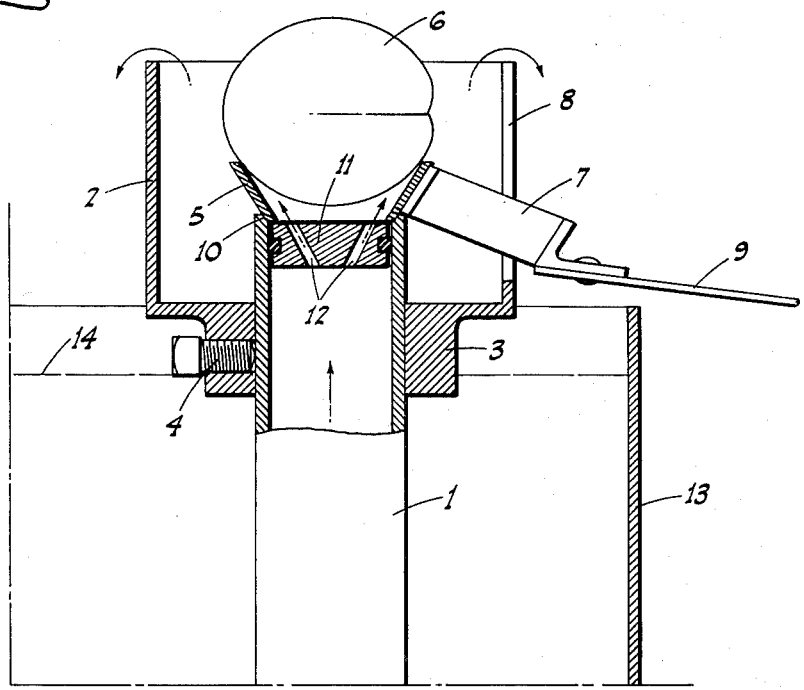
FIG. 1 is a sectional elevation of the improved fruit orienting jet unit, showing an oriented fruit supported in the lifting cup.
Figure 2:
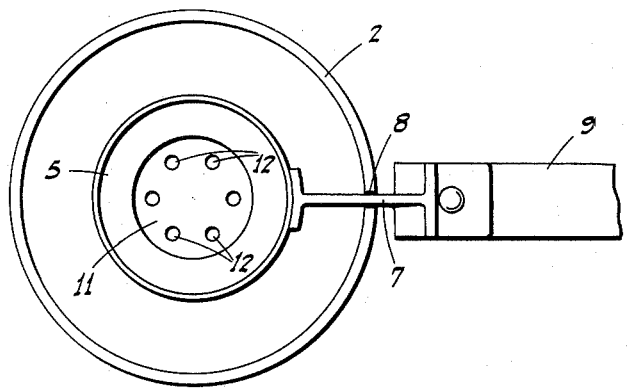
FIG. 2 is a top plan view of the unit with the fruit removed.

Referring now more particularly to the drawings and to the characters of reference marked thereon, and particularly at present to the structure shown in FIGS. 1 and 2, the improved fruit orienting jet unit comprises a vertical rigid pipe 1, initially open at its upper end and arranged at its lower end to receive an upwardly directed flow of water under pressure.

A water receiving cylindrical container 2, open at the top and of considerably larger diameter than the pipe 1, surrounds the latter and projects thereabove. At the bottom, the water container 2 is formed with a depending collar 3 which closely engages but is slidable on the pipe; the collar adjustably clamped to the pipe by a set screw 4.

A taper-sided open-ended cup 5 (of a size to receive and support an apricot 6 or similar fruit to be oriented) is adapted to be initially positioned and supported on the upper end of the pipe 1. After the fruit is oriented in the cup, as later described, the cup is swung upwardly from such position and into cooperating relation with the fruit halving knives (not shown) of the machine; this being accomplished by a suitable mechanism which is preferably the same as that shown in my co-pending application Serial No. 333,019 filed Dec. 23, 1963.

Such mechanism includes a short, rigid and horizontally narrow arm 7 secured to and projecting radially from one side of the cup 5, and thence through a correspondingly narrow vertical slot 8 in the side of the container 2 and open to the upper end thereof. Outside of the container, the arm 7 is secured at its outer end to the adjacent end of a spring arm 9 which extends to and is connected with the swing-control portion of such mechanism.

The size of the cup 5 at the bottom is substantially the same as that of the pipe 1, and is arranged to have a close symmetrical fit in the tapered upper end of the pipe 1, as indicated at 10. Immediately below the cup 5, a plug 11 is mounted in the pipe 1; the plug being fitted with an O ring seal as shown. This plug is formed with a plurality of jet passages 12 therethrough and disposed in a circumferential row; each such jet passage sloping upwardly and outwardly at an angle to the vertical slightly less than that of the slope of the cup 5.

In operation, the apricots to be oriented are first deposited in a tank 13 surrounding the pipe 1, and in which tank water is maintained to a level 14 below the container 2. The water jets, constantly issuing from the passages 12, keep the container 2 full to overflowing even though there is some leakage or escape through the slot 8; all of the overflowing and escaping water falling into the tank 13.

In each fruit orienting cycle, one apricot is engaged, lifted from the water in tank 13, and allowed to roll into the cup 5 by a suitable elevator (not shown) but which may be of the type shown in my co-pending application Serial No. 216,529, now Patent No. 3,138,184. The container 2 is initially vertically adjusted on pipe 1 to a position (depending on the size of the apricots being oriented) such that each apricot when delivered to the cup 5 will substantially float in said overflowing container. This prevents the full weight of the apricot from bearing on the side wall of, and possibly wedging in, the cup. Further, and of importance, the water jets from passages 12 do not have to lift the full weight of the apricot and hence the pressure of such jets does not have to be as great as would otherwise be the case.

Upon an apricot being delivered to the cup 5 and substantially floating in container 2, the water jets act in an inverted cone pattern upon the underside (except the central lower area) of such apricot to thus lift and turn it until by virtue of the fruit shape a horizontal suture position of orientation is attained.

As previously described, the angle of slope of the jet passages 12 relative to vertical is somewhat less than that of the side wall of the cup 5. This insures that the inverted cone pattern of the water jets will engage the underside of the apricot a slight distance inwardly of the inner wall of the cup, and which has been found to provide the speediest and most efficient orienting action. Irrespective of its initial position in the cup, the apricot will be quickly disposed with its line of suture in a horizontal plane.

It may here be noted that if the water jets are angled too much, less lift is imparted to the fruit and there is a tendency for it to be pulled down into the cup, so that the fruit resists being moved to an oriented position. If, on the other hand, the angle of the water jets is too steep, an excessive lift is imparted to the fruit, and the same is apt to "bobble" about erratically. The proper balance between excessive "lift" on the one hand and undesirable "pull down" on the other is achieved by disposing the jet passages as shown and described.

It will also be seen that there is no central or axial jet passage in the plug 11 as a central water jet would act adversely to hold the stem cavity of the fruit in a downward position.

Upon each apricot being oriented to a horizontal suture position, the cup with the oriented apricot therein is swung upwardly and laterally outwardly by the arm 9, and to a point at which the apricot is in position for engagement by the halving and pitting mechanism of the machine.

The quantity of water maintained in the container 2 at all times not only serves to substantially float the fruit deposited in the cup 5 for the purpose hereinbefore described, but also serves to damp and contain the water jets when the latter are unrestricted by the absence of a fruit in the cup, and which water jets would otherwise spray widely over the machine and the adjacent floor.

Figure 3:
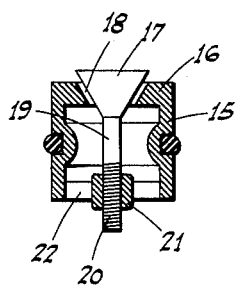
FIG. 3 is a sectional elevation of a modified form of water jet forming plug, detached.

A modified type of water jet forming plug is shown in FIG. 3. In this embodiment, the pipe engaging plug 15 is a hollow member open at the bottom, but provided with a top wall 16. An inverted cone shaped valve 17 projects upwardly and in clearance relation through a similarly shaped opening 18 in the top wall 16; the angularity of the valve and opening being the same as that of the jet passages 12 previously described. The valve 17 is provided with a depending stem 19 having its lower portion adjustably threaded, as at 20, through a boss 21 formed with a spider 22 in the lower end of the body 15. By reason of this arrangement, the valve 17 may be rotated to adjust it vertically and to alter the width of the space between the valve and the wall of the opening 18. This, therefore, alters the size and velocity of the full-circle water jet issuing through such opening and as operating conditions may require. Such full-circle water jet has the same fruit orienting action as previously described in relation to the embodiment of FIGS. 1 and 2.

In connection with the fruit orienting unit herein shown and described, it will be understood that in the complete machine of which this unit is a part, there is a row or bank of such units; the corresponding water pressure pipes 1 all being connected to a common manifold, while a single tank 13 is common to all the units of the bank.

From the foregoing description, it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A fruit orienting unit comprising an upstanding pipe arranged to receive an upwardly directed flow of water under pressure, a sloping-sided open-ended fruit receiving cup adapted to seat on the upper end of the pipe and to be lifted therefrom after the fruit thereon has been oriented, a plug in the pipe at its upper end, and passage means in the plug arranged to cause a circumferential water jet pattern to be directed upwardly in the cup radially inward from the lower edge thereof; said means comprising a plurality of passages extending through the plug in a circular row concentric with the axis of the plug and of the cup; the passages being disposed at an upward and outward slope less than that of the slope of the cup.

2. A fruit orienting unit comprising an upstanding pipe arranged to receive an upwardly directed flow of water under pressure, a sloping-sided open-ended fruit receiving cup adapted to seat on the upper end of the pipe and to be lifted therefrom after the fruit thereon has been oriented, a plug in the pipe at its upper end, and passage means in the plug arranged to cause a circumferential water jet pattern to be directed upwardly in the cup radially inward from the lower edge thereof; the plug including a top wall, and said means comprising a valve of inverted conical form disposed centrally of the plug and projecting through an opening in the top wall thereof, the opening having a circumferential wall substantially parallel to and concentric with but spaced from said valve, and means vertically adjustably mounting the valve in the plug.

3. A unit, as in claim 2, in which said last named means comprises a stem depending from the valve, the lower portion of the stem being threaded, a tapped boss through which said stem portion extends, and a boss supporting spider on the plug.

4. A fruit orienting unit comprising an upstanding pipe arranged to receive an upwardly directed flow of water under pressure, a sloping-sided open-ended fruit receiving cup adapted to seat on the upper end of the pipe and to be lifted therefrom after the fruit thereon has been oriented, a plug in the pipe at its upper end, and passage means in the plug arranged to cause a circumferential water jet pattern to be directed upwardly in the cup radially inward from the lower edge thereof; and a water container surrounding and projecting above the pipe and the cup in clearance relation thereto; the water from said jet pattern being received in the container.

5. A unit, as in claim 4, with an arm projecting radially from the cup whereby it may be lifted, the arm including a horizontally narrow portion adjacent the cup, and the container having a vertical slot open to the upper end thereof and through which slot said narrow arm portion projects.

6. A unit, as in claim 4, with means mounting the container on the pipe for vertical adjustment relative thereto.

7. A fruit orienting unit comprising an upstanding pipe arranged to receive an upwardly directed flow of water under pressure, a sloping-sided open-ended fruit receiving cup adapted at its lower edge to seat on the upper end of the pipe in substantially watertight relation and to be lifted therefrom after the fruit thereon has been oriented, a plug in the pipe at its upper end, passage means through the plug arranged to cause a circumferential water jet pattern to be directed upwardly in the cup radially inward from the lower edge thereof and at an upward slope less than that of the cup, a water container surrounding and projecting above the pipe and cup in clearance relation thereto, water from said jet pattern being received in the container, a collar on the lower end of the container embracing and secured to the pipe for vertical adjustment thereon, and an arm projecting radially from the cup whereby said cup may be lifted; the arm including a horizontally narrow portion adjacent the cup, and the container having a vertical slot in its wall open to the upper end thereof and through which slot said arm portion projects with a running fit.

8. A fruit orienting unit comprising an upstanding pipe arranged to receive an upwardly directed flow of water under pressure, a substantially circular fruit receiving cup adapted to seat on the upper end of the pipe in removable relation, the cup having an open bottom, and means in the upper end of the pipe operative to cause a circumferential water jet pattern to discharge upwardly in the cup and to impinge against the underside of the fruit.

9. A unit, as in claim 8, in which the side wall of the cup slopes upwardly and outwardly, and said means being arranged so that the water jet pattern is substantially symmetrical to said sloping side wall.

10. A fruit orienting unit comprising an upstanding pipe arranged to receive an upwardly directed flow of water under pressure, a substantially circular fruit receiving cup adapted to seat on the upper end of the pipe in removable relation, the cup having an open bottom, and means in the upper end of the pipe operative to cause a circumferential water jet pattern to discharge upwardly through the cup and against an area of the underside of the fruit other than the central lower area thereof.

References Cited by the Examiner
UNITED STATES PATENTS

| | | |
|---|---|---|
| 1,711,051 | 4/29 | Gates. |
| 2,268,696 | 1/42 | Garroll. |
| 2,793,734 | 5/57 | Lorenzen _____ 198—33.1 |
| 2,911,745 | 11/59 | Simon _____ 46—44 X |
| 2,921,144 | 1/60 | Martin. |
| 3,081,036 | 3/63 | Hruby _____ 239—17 |

GERALD M. FORLENZA, *Primary Examiner.*
MARVIN A. CHAMPION, *Examiner.*